United States Patent [19]

Kohyama et al.

[11] Patent Number: 4,519,698

[45] Date of Patent: May 28, 1985

[54] IMAGE FORMING APPARATUS INCLUDING A CLEANING BLADE AND DRUM LUBRICANT

[75] Inventors: Mitsuaki Kohyama, Tokyo; Kenshi Toshimitsu, Yokohama, both of Japan

[73] Assignee: Tokyo Shibaura Denki Kabushiki Kaisha, Kawasaki, Japan

[21] Appl. No.: 411,363

[22] Filed: Aug. 25, 1982

[30] Foreign Application Priority Data

Sep. 3, 1981 [JP] Japan ............................... 56-138815

[51] Int. Cl.$^{3}$ ...................... G03G 21/00; F16N 15/00; B05C 11/105; E21B 10/22

[52] U.S. Cl. .................................. 355/15; 355/3 FU; 118/652; 184/99; 310/228

[58] Field of Search ........... 15/256.53, 256.51, 256.52; 355/15, 3 FU; 118/652, 653; 430/125; 184/10, 99; 310/228

[56] References Cited

U.S. PATENT DOCUMENTS

| | | | |
|---|---|---|---|
| 2,555,997 | 6/1951 | Portail | 310/228 X |
| 2,987,350 | 6/1961 | Hay | 184/99 X |
| 3,590,957 | 7/1971 | Campbell et al. | 184/99 |
| 3,896,903 | 7/1975 | Takimoto | 184/99 |
| 4,279,500 | 7/1981 | Kondo et al. | 118/652 |
| 4,381,824 | 5/1983 | Pastusek | 184/99 X |
| 4,407,219 | 10/1983 | Dellevoet | 355/3 FU X |

*Primary Examiner*—A. T. Grimley
*Assistant Examiner*—Terry Flower
*Attorney, Agent, or Firm*—Cushman, Darby & Cushman

[57] ABSTRACT

An image forming apparatus comprises a rotatable photosensitive drum driving mechanism for rotating the photosensitive drum; and a cleaning blade which is capable of being in contact with the outer circumferential surface of the photosensitive drum and which removes a residual developer on the outer circumferential surface upon contact therewith.

A recess is formed at part of the outer circumferential surface and holds lubricant therein; and the tip end of the cleaning blade feeds the lubricant in the recess to part of the outer circumferential surface of the photosensitive drum which is brought into contact with the cleaning blade to form a thin film of the lubricant upon contacting with the lubricant held in the recess as said photosensitive drum is rotated.

13 Claims, 9 Drawing Figures

IMAGE FORMING APPARATUS INCLUDING A CLEANING BLADE AND DRUM LUBRICANT

BACKGROUND OF THE INVENTION

The present invention relates to an image forming apparatus which has a photosensitive body for forming an electrostatic latent image thereon and which visualizes the image with a developer and, more particularly, to an image forming apparatus which cleans with a cleaning blade the residual developer on the surface of a photosensitive body.

In an image forming apparatus such as an electrostatic copying apparatus, a nontransferred toner remaining on the surface of a photosensitive drum is generally scraped off with a cleaning blade to clean the photosensitive drum.

If a relatively great frictional force acts between the photosensitive drum and the cleaning blade, the surface of the photosensitive drum may be damaged or filming of the toner may result; stress acting on the blade may deteriorate the desired contact state to cause turning-up; and, static electricity generated by friction results in non-uniform surface potential in the charging step, which, in turn, causes an irregular image formation or fogging. In order to reduce the frictional force, the pressure of the cleaning blade may be reduced. However, if these measures are taken, the cleaning blade may not be able to function well for its original purpose, that is, cleaning, or the problem of filming may recur.

In order to reduce the frictional force acting between the cleaning blade and the photosensitive drum while maintaining a predetermined pressure of the cleaning blade, it has been conventionally proposed to add a lubricant such as wax to the toner. However, in this case, due to the presence of the lubricant in the toner, fixability of the toner may be degraded or filming may also be caused. This significantly degrades the image quality and renders this proposal impractical.

It has also been known to manually apply a lubricant such as wax on the surface of the photosensitive drum. However, no method has been proposed which is capable of maintaining the thickness of the lubricant film formed on the photosensitive drum for a long period of time within a range of below several hundred angstroms so as not to interfere with the electrostatic characteristics of the photosensitive drum. Attempts have also been made to construct the cleaning blade with a material having a low coefficient of friction. However, these attempts are also subject to the problem of degradation in other characteristics, especially mechanical strength, due to the addition of additives.

SUMMARY OF THE INVENTION

The present invention has been made in consideration of these problems and has for its object to provide an image forming apparatus which is simple in construction, and which is capable of reducing to the minimum the frictional force acting between a cleaning blade and a photosensitive body while maintaining the contact pressure between them at a predetermined level.

According to an aspect of the present invention, there is provided an image forming apparatus which comprises: a rotatable photosensitive body including an outer circumferential surface which has a recess for holding a lubricant therein at part thereof; driving means for rotating the photosensitive body; a cleaning blade which is capable of being in contact with the outer circumferential surface of the photosensitive body and which removes a residual developer on the outer circumferential surface upon contact therewith; and feeding means for feeding the lubricant held in the recess to part of the outer circumferential surface of the photosensitive body which is brought into contact with the cleaning blade to form a thin film of the lubricant upon contacting with the lubricant held in the recess as the photosensitive body is rotated.

If a lubricant is mixed with a developer, fixability of the developer is degraded and filming occurs. These problems are eliminated by the image forming apparatus of the present invention. The thickness of the lubricant film may be kept uniform, unlike the case wherein the lubricant is applied around the photosensitive body by hand. The mechanical strength of the cleaning blade may not be degraded and the frictional force acting between the photosensitive body and the cleaning body may be reduced to the minimum, unlike the case wherein the cleaning blade itself is made of a material having a low coefficient of friction.

DETAILED DESCRIPTION OF THE PREFERRED EMBODIMENTS

One embodiment of the present invention will now be described with reference to FIGS. 1 to 5 of the accompanying drawings.

Figure 1:
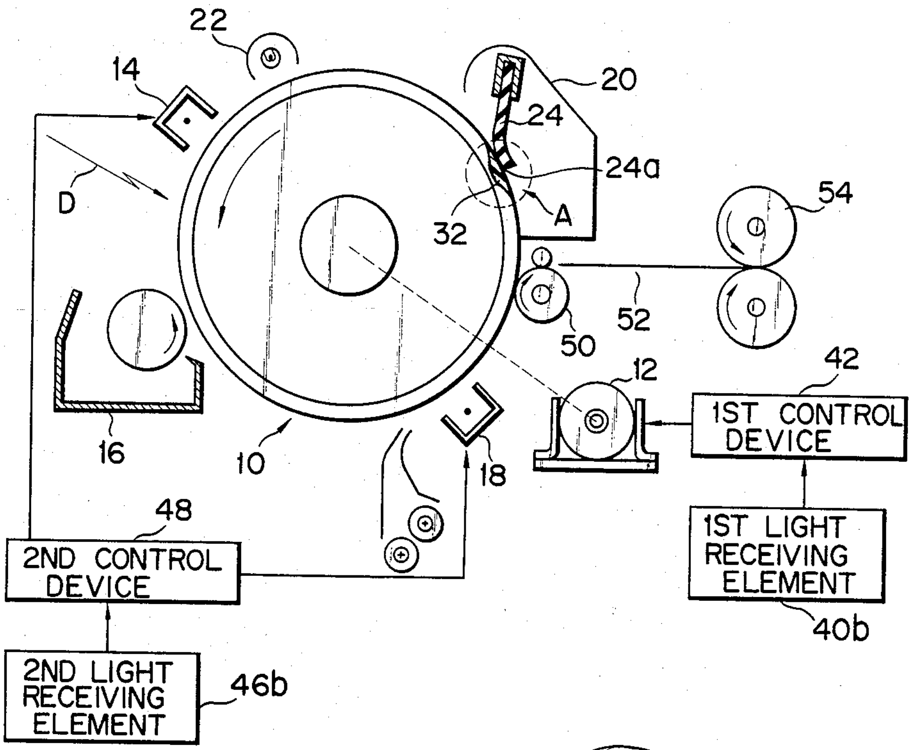
FIG. 1 is a schematic front view showing one embodiment of an image forming apparatus according to the present invention.

Referring to FIG. 1, a cylindrical photosensitive drum 10 is rotatably mounted inside an electrostatic copying apparatus as an image forming apparatus. The photosensitive drum 10 is driven by a motor 12 to rotate counterclockwise. A charger 14, a developing unit 16, a transfer unit 18, a cleaning unit 20, and a discharger 22 are sequentially arranged around the photosensitive drum 10 in the rotating direction thereof. The cleaning unit 20 has a fixed cleaning blade 24 which is in contact with the outer circumferential surface of the photosensitive drum 10 along the axial direction thereof. The cleaning blade 24 is made of a resilient polyurethane rubber and is urged against the surface of the photosensitive drum 10 under its resilient force.

Figure 2:
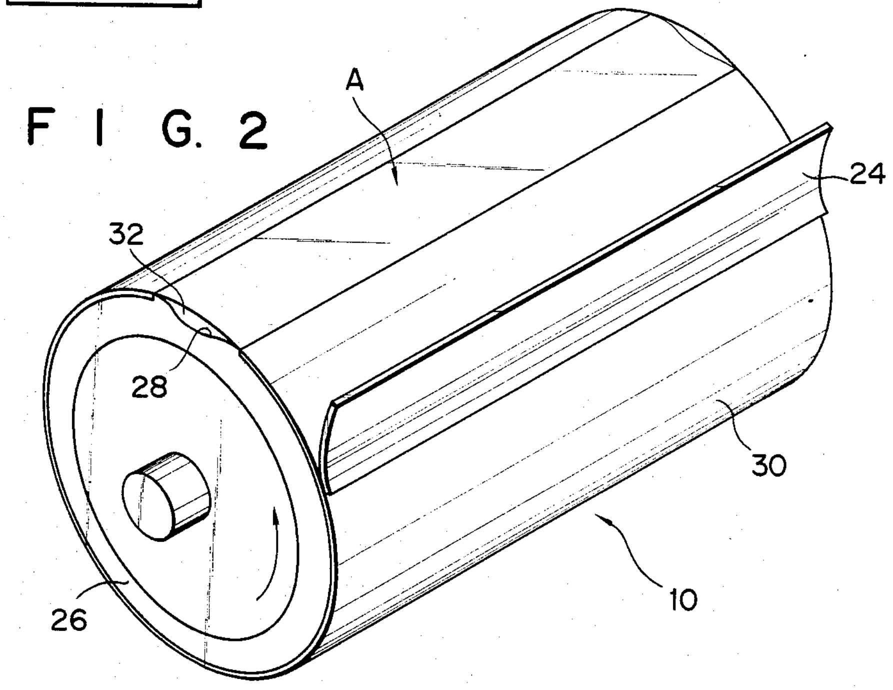
FIG. 2 is a perspective view showing a photosensitive drum shown in FIG. 1 together with a cleaning blade.
Figure 3:
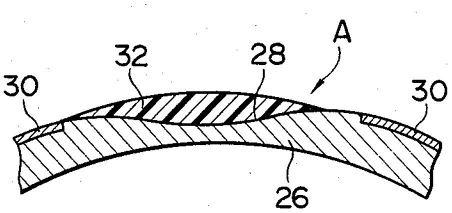
FIG. 3 is a sectional view showing a lubricant feeding section.

The photosensitive drum 10 has a drum-shaped base 26, as shown in FIG. 2. A recess 28 constituting a lubricant feeding section A is formed on the outer circumferential surface of the base 26 along the axial direction thereof. A photosensitive layer 30 is formed on the outer circumferential surface of the base 26 except for its part corresponding to the recess 28. A lubricant 32 to be described later is held in the recess 28. The recess 28 is defined by an arc-shaped curved surface smoothly extending from the outer circumferential surface of the base 26, as shown in FIG. 3. If a distal edge 24*a* of the cleaning blade 24 falls into the recess 28 with only little or no lubricant remaining therein, the distal edge 24*a* may not be damaged due to the curved contour of the recess 28. The impact of fall of the cleaning blade 24 into the recess 28 may not be given to the photosensitive drum 10. Therefore, undesired developing due to the asynchronous rotation of the photosensitive drum 10 may be prevented. The solid lubricant 32 may be a polypropylene-type resinous wax, carnauba wax, cotton wax, paraffin wax or stearic acid of a suitable hardness.

Figure 4:
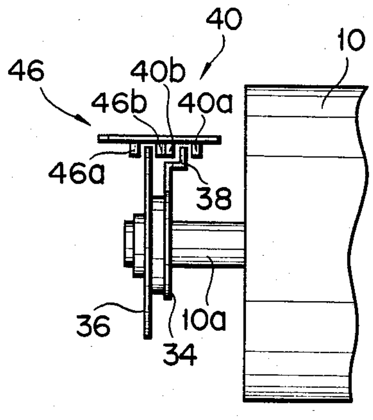
FIG. 4 is a side view showing two timing discs mounted on the photosensitive body.

The driving operation of the motor 12 is electrically controlled so that the distal edge 24*a* of the cleaning blade 24 is brought into contact with the lubricant 32 held in the recess 28 when the photosensitive drum 10 is stationary. As shown in FIG. 4, first and second timing discs 34 and 36 which are rotated synchronously with the rotation of the photosensitive drum 10 are coaxially mounted with a separation between them at one end of a support shaft 10*a* of the drum 10. A projection 38 is formed to extend from the outer periphery of the first timing disc 34, as shown in FIG. 4. A first photocoupler 40 is arranged around the first timing disc 34. The first photocoupler 40 has a first light-emitting element 40*a*, and a first light-receiving element 40*b* for receiving light emitted by the element 40*a*. The first light-receiving element 40*b* is connected to a first control device 42 which is, in turn, connected to the motor 12.

When the first light-receiving element 40*b* receives light, it supplies a drive signal for the motor 12 to the first control device 42. On the other hand, when the first light-receiving element 40*b* does not receive light, that is, when the projection 38 is located between the elements 40*a* and 40*b*, it supplies a stop signal for the motor 12 to the first control device 42. The first timing disc 34 is so attached on the support shaft 10*b* that the projection 38 thereof may be located between the first light-emitting element 40*a* and the first light-receiving element 40*b* in the noncopying state.

Figure 5:
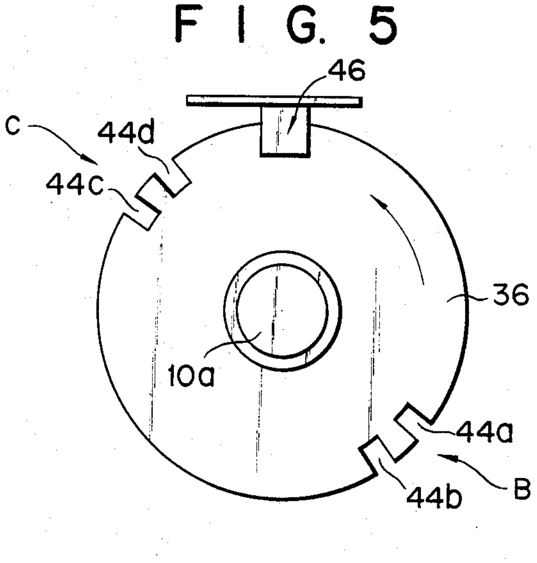
FIG. 5 is a front view of the second timing disc.

At least four slits, first to four slits 44*a* to 44*d*, in this case, are formed on the outer periphery of the second timing disc 36, as shown in FIG. 5. The first and second slits 44*a* and 44*b* are formed adjacent to each other to make up a charge position detector B, while the third and fourth slits 44*c* and 44*d* are similarly formed adjacent to each other to make up a transfer position detector C. A second photocoupler 46 is arranged around the outer periphery of the second timing disc 36, as shown in FIG. 4. The second photocoupler 46 has a second light-emitting element 46*a*, and a second light-receiving element 46*b* for receiving light from the element 46*a*. The second light-receiving element 46*b* is connected to a second control device 48 which is, in turn, connected to the charger 14 and the transfer unit 18.

The charge position detector B and the transfer position detector C are formed on the second timing disc 36 so that they are spaced apart from each other through an angular distance the same as that between the charger 14 and the transfer unit 18. The second timing disc 36 is so fixed on the support shaft 10*a* that the charge position detector B may reach the second photocoupler 46 when the recess 28 of the photosensitive drum 10 opposes the charger 14, and the transfer position detector C may reach the second photocoupler 46 when the recess 28 opposes the transfer unit 18.

When the first slit 44*a* reaches the second photocoupler 46 to establish a light-receiving state of the second light-receiving element 46*b*, the second light-receiving element 46*b* supplies an OFF signal for the charger 14 to the second control device 48. On the other hand, when the second slit 44*b* reaches the second photocoupler 46 to establish another light-receiving state of the second light-receiving element 46*b* the second light-receiving element 46*b* supplies an ON signal for the charger 14 to the second control device 48. Further, when the third slit 44*c* reaches the second photocoupler 46 to establish still another light-receiving state of the second light-receiving element 46*b*, the second light-receiving element 46*b* supplies an OFF signal for the transfer unit 18 to the second control device 48. When the fourth slit 44*d* reaches the second photocoupler 46 to establish still another light-receiving state of the second light-receiving element 46*b* the second light-receiving element 46*b* supplies an ON signal for the transfer unit 18 to the second control device 48. The angle between the first and second slits 44*a* and 44*b* and that between the third and fourth slits 44*c* and 44*d* are set to equal that of both edges of the recess 28 along the outer circumference of the photosensitive drum 10.

Referring to FIG. 1, reference numeral 50 denotes a separation roller for separating a copying paper from the photosensitive drum 10; 52, a conveying path for the copying paper; and 54, a fixing unit.

The mode of operation of the copying apparatus of the construction as described above will now be described. The photosensitive layer 30 of the photosensitive drum 10 is charged by the charger 14 while an original is illuminated with light from a light source (not shown). Light reflected from the original becomes incident on the surface of the photosensitive layer 30 as indicated by arrow D to form an electrostatic latent image corresponding to the image of the original. As the photosensitive drum 10 rotates, the electrostatic latent image formed thereon reaches the developing unit 16 to be visualized with a developer such as toner. The visualized image is transferred onto a copying paper by the transfer unit 18. The copying paper with the transferred image thereon is separated from the photosensitive drum 10 by the separation roller 50. Thereafter, the separated copying paper is fed to the fixing unit 54, and the transferred image is fixed onto the copying paper. On the other hand, the residual toner on the photosensitive drum 10 which has not be transferred onto the copying paper is scraped off by the cleaning blade 24 of the cleaning unit 20. The scraped toner is recovered to the developing unit 16. The charge on the photosensitive drum 10 is discharged by the discharger 22 for the next copying cycle. In this manner, one copying cycle is completed.

Before one copying cycle is initiated, the cleaning blade 24 of the cleaning unit 20 is in contact with the lubricant 32 held in the recess 28 formed on the surface of the photosensitive drum 10, so that a small amount of the lubricant 32 is constantly applied to the distal edge 24*a*. For this reason, the frictional force acting between the cleaning blade 24 and the surface of the photosensitive drum 10 is small, providing the same effects as a cleaning blade having a small coefficient of friction. As the photosensitive drum 10 rotates, the lubricant 32 applied onto the distal edge 24*a* of the cleaning blade 24 is uniformly supplied over the entire outer circumferential surface of the drum 10 to form an extremely thin film of lubricant thereon. Due to the presence of this thin film of lubricant, the photosensitive drum 10 itself will also have a small coefficient of friction. The thin film of lubricant moreover serves as a protective film. In this manner, the lubricant is constantly present between the cleaning blade 24 and the photosensitive drum 10, so that frictional stress acting therebetween may be significantly reduced.

The distal edge 24*a* of the cleaning blade 24 is formed with an edge precision of about 3 to 6 microns, and has a proper resiliency and a blade hardness of about 60° to 80°. Therefore, the film thickness of the lubricant 32 on the photosensitive layer 30 of the photosensitive drum 10 may be kept constant. Further, the film thickness of the lubricant may also be finely controlled by suitably selecting the hardness of the lubricant 32, the contact pressure of the cleaning blade 24, and so on. The thickness of the lubricant film formed on the photosensitive layer 30 tends to decrease as the hardness of the lubricant 32 increases, that is, the molecular weight thereof increases to several thousands to several hundred thousands and as the blade pressure (linear pressure) increases to 1.5 to 4.0 g/mm. The thickness of the lubricant film is hard to measure, in practice. However, if the blade pressure is 1.5 g/mm or less, the film thickness is assumed to be too great and deteriorates the image quality. The fact that a wax film of a non-uniform thickness is formed with the blade pressure being less than 1.5 g/mm may also be confirmed from irregular gloss on the surface of the photosensitive layer 30. In summary, according to the one embodiment described above, an extremely thin film of the lubricant can be formed on the photosensitive layer 30, and its thickness can be kept for a long period of time within a range such that the electrostatic characteristics of the photosensitive layer 30 may not be adversely affected.

According to the one embodiment described above, the lubricant 32 is fed to the cleaning blade 24 to form a uniform film thereof on the photosensitive layer 30. The frictional stress acting between the photosensitive drum 10 and the cleaning blade 24 may be reduced to the minimum without interfering with the functions of either part. Conventional apparatuses are subject to various problems including turning up of the cleaning blade 24, damage to the surface of the photosensitive layer 30 and filming, which are caused due to a great frictional stress acting between the cleaning blade 24 and the photosensitive drum 10; degradation in the image quality due to static electricity resulting from friction between the cleaning blade 24 and the photosensitive drum 10; or filming due to incomplete cleaning which results from a significant drop in the blade pressure for the purpose of reducing the frictional stress acting between the cleaning blade 24 and the photosensitive drum 10. However, the copying apparatus according to the present invention avoids these drawbacks.

According to the one embodiment, the problem encountered in application of the lubricant 32 such as wax on the entire surface of the photosensitive layer 30, that is, control of the film thickness (precision and uniformity) may also be eliminated. For this reason, factors which might adversely affect the electrostatic characteristics of the photosensitive drum 10 and which are encountered during application of the lubricant 32 may also be eliminated.

Since the lubricant 32 is fed to the cleaning blade 24 every time the photosensitive drum 10 rotates once, the advantageous effects as described above may be maintained for a long period of time until no more lubricant 32 is available.

Since the recess 28 for holding the lubricant 32 has an arc shape, the distal edge 24*a* of the cleaning blade 24 may not be damaged even if there is only little or no lubricant 32 remaining in the recess 28. Accordingly, the copying machine may be used until no more lubricant 32 is available. Furthermore, the problem of shift in the position of the photosensitive drum 10 is eliminated which is caused by an impact which acts on it when the cleaning blade 24 passes over the lubricant feeding section A.

The lubricant 32 used in the present invention is a semiconductor having a resistance of $10^6$ to $10^{14}$ Ω·cm or a resistor having a high resistance and is held in an average depth of 0.5 to several mm. If the lubricant 32 is subject to charging by the charger 14 or the fixing unit 18 in this state, the surface of the lubricant 32 is charged and is then developed to degrade the image quality. However, according to the one embodiment, the charger 14 and the transfer unit 18 are electrically controlled through the second control device 48 so that the lubricant feeding section A may not be subject to charging. Therefore, the above problem is also prevented.

Irrespective of whether the photosensitive drum 10 is stationary or rotating, the cleaning blade 24 is in constant contact with the surface of the photosensitive drum 10. When the photosensitive drum 10 is stationary, the cleaning blade 24 is in contact with the lubricant feeding section A. Therefore, the cleaning blade 24 may not be brought into contact with the image formation region of the photosensitive layer 30 and may not deform it when the photosensitive drum 10 is stationary. As a result of this, the cleaning blade 24 need not be spaced apart from the photosensitive layer 30 when the photosensitive drum 10 is stationary. Other problems of degradation in the image quality, contamination of the interior of the copying apparatus by toner, imprecise contact between the cleaning blade 24 and the photosensitive layer 30, and the driving means of the cleaning blade 24 are also eliminated.

EXAMPLE

Photosensitive Material: Se
Wax: Polypropylene-type wax
Depth of recess: 1 mm
Cleaning blade: Polyurethane blade (74° hardness, 2 mm thickness, about 6 μ edge precision)

Using the materials as described above, 20,000 copies were produced with blade linear pressures of 2.0 and 4.0 g/mm acting on the photosensitive layer 30, respectively. During the time period for reproducing these copies, no adverse effects on the image quality and electrostatic characteristics due to incorporation of the lubricant feeding part and application of the lubricant were observed, as may be seen from the table below.

Good results were obtained with respect to ease of cleaning, lack of filming on the photosensitive drum 10 and so on. Better results were also obtained with regard to damage to the photosensitive layer 30 and so on than with the conventional copying machine.

TABLE

| | After Reproduction of 20,000 copies | | | |
|---|---|---|---|---|
| | Copying Apparatus of One Embodiment | | Copying Machine of Prior Art | |
| | 2.0 g/mm | 4.0 g/mm | 2.0 g/mm | 4.0 g/mm |
| Filming | o | o | o | Δ By Blade Damage |
| Cleaning ability | o | o | o | Δ By Blade Damage |
| Electrostatic Characteristics | o | o | o | Δ Degradation Due To Scratches |
| Drum Scratch | o | o | Δ | x |
| Blade Outer Appearance | o | o | Δ | x |

o: good
Δ: normal
x: bad

Figure 6:
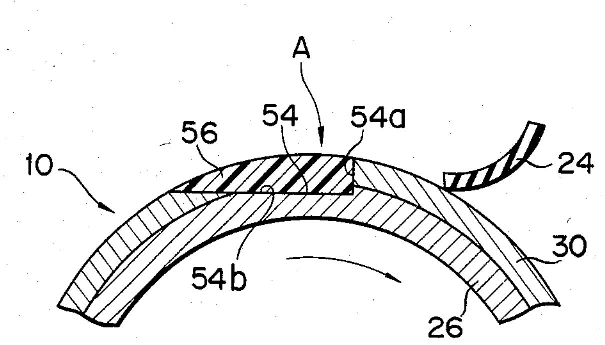
FIG. 6 is a sectional view showing a first modification of the lubricant feeding section.

The present invention is not limited to the one embodiment described above. For example, FIG. 6 shows a first modification wherein the lubricant feeding section A comprises a recess 54 formed in the outer circumferential surface of the drum 10. The recess 54 is defined by a first flat surface 54*a* extending toward the center of the drum 10 and a second flat surface 54*b* perpendicular thereto. A solid lubricant 56 is held within the recess 54. According to the first modification, the solid lubricant 56 may not be inadvertently removed from the drum 10. The solid lubricant 56 may be inserted into the recess 54 from the end surface of the photosensitive drum 10, improving the serviceability such as exchange of the solid lubricant 56. The second flat surface 54*b* of the recess 54 is formed along the outer circumferential surface of the photosensitive drum 10 so as to reduce an impact which may act upon contact with the cleaning blade 24.

Figure 7:
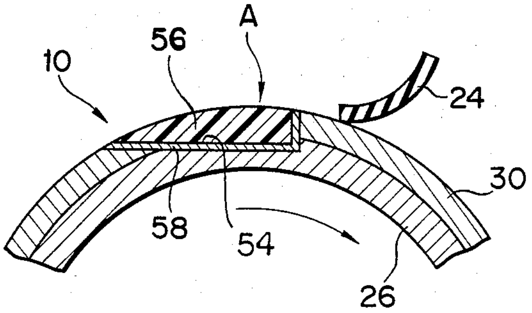
FIG. 7 is a sectional view showing a second modification of the lubricant feeding section.

FIG. 7 shows a second modification wherein a lubricant support plate 58 for fixing the lubricant 56 in the recess 54 is arranged. The support plate 58 is arranged tightly inside the recess 54 so as to facilitate serviceability and exchangeability of the lubricant 56.

Figure 8:
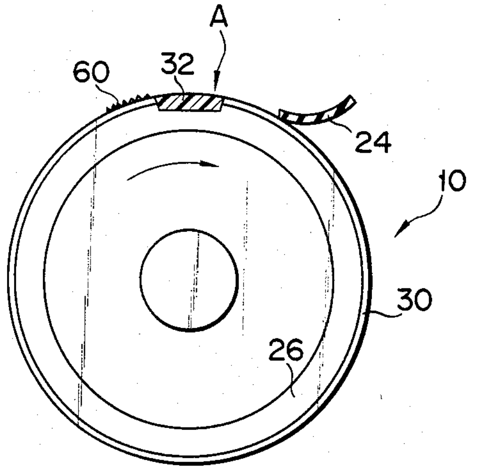
FIG. 8 is a sectional view showing a third modification of the lubricant feeding section.

FIG. 8 shows a third modification wherein a plurality of small projections 60, of 20 to 100 microns size are arranged behind the lubricant feeding section A of the photosensitive drum 10 along the rotating direction thereof. According to the third modification, the amount of the lubricant 32 attached to the cleaning blade 24 may be more precisely controlled.

It is also possible to prevent removal of the lubricant 32 from the recess 28 by forming indentation at the interface between the recess 28 and the lubricant 32 which is shown in FIG. 3..

Depending upon the type of lubricant used, the lubricant 32 may function until the lifetime of the drum expires.

Figure 9:
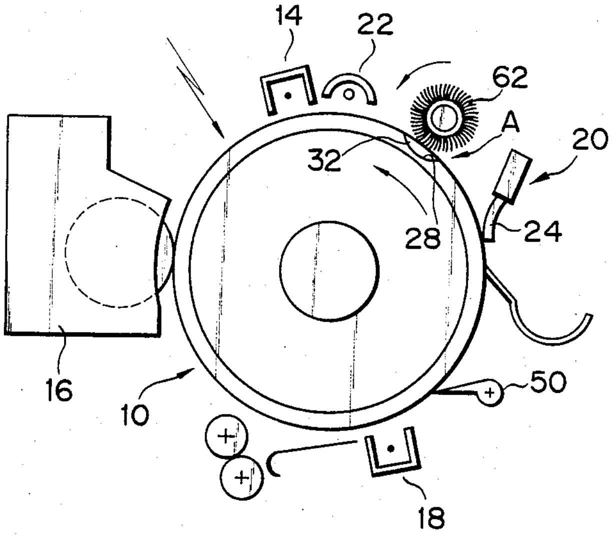
FIG. 9 is a schematic front view showing another embodiment of an image forming apparatus according to the present invention.

As described above, the cleaning blade 24 can be used as a feeding means for the lubricant 32 or 56. However, the present invention is not limited to this construction. FIG. 9 shows another embodiment which uses a cylindrical brush 62 for feeding the lubricant 32. The reference numerals shown in FIG. 9 which are common with those shown in FIGS. 1–8, denote the same members, and, thus, descriptions thereof have been omitted. The cylindrical brush 62 as a feeding means of the lubricant 32 rotates in contact with that portion of the outer circumferential surface of the photosensitive drum 10 which is between the cleaning blade 24 and the discharger 22. The thickness of the lubricant film formed on the photosensitive drum 10 may be controlled according to selection of hardness, length, rotational frequency and so on of the brush.

What we claim is:

1. An image forming apparatus comprising:
   a rotatable photosensitive body including an outer circumferential surface having a recess for holding a lubricant therein at a part thereof, said recess being formed to extend from one side to the other side of said outer circumferential surface;
   driving means for rotating said photosensitive body;
   a cleaning blade for removing a residual developer on said outer circumferential surface upon contact therewith, said cleaning blade having an edge portion which extends from said one side to said the other side of said outer circumferential surface, said edge portion being in contact with said outer circumferential surface of said photosensitive body, said cleaning blade being capable of falling into said recess; and
   feeding means for feeding any lubricant held in the recess to part of the outer circumferential surface of said photosensitive body which is brought into contact with said cleaning blade to form a thin film of lubricant upon contacting with any lubricant held in said recess as said photosensitive body is rotated.

2. The apparatus according to claim 1, wherein said recess extends parallel to a rotating axis of said photosensitive body.

3. The apparatus according to claim 1, wherein said recess comprises a bottom surface extending smoothly from said outer circumferential surface.

4. The apparatus according to claim 3, wherein said bottom surface has an arc-shaped curved surface portion.

5. The apparatus according to claim 1, wherein said driving means includes: a motor for driving said photosensitive body; and first controlling means, connected to said motor, for stopping said photosensitive body in a position to oppose said recess in a noncopying state.

6. The apparatus according to claim 5, wherein said cleaning blade is constantly urged against said outer circumferential surface of said photosensitive body at a predetermined pressure.

7. The apparatus according to claim 1, wherein said feeding means includes said edge portion of said cleaning blade.

8. The apparatus according to claim 1, wherein said feeding means includes:
   a rotatable brush roller which is, upon rotation of said photosensitive body, brought into contact with the lubricant held in said recess to feed the lubricant to said part of said photosensitive body which is brought into contact with said cleaning blade and to form a thin film of the lubricant.

9. The apparatus according to claim 8, which further comprises:
   charging means, arranged around said outer circumferential surface of said photosensitive body, for charging said outer circumferential surface; and
   second controlling means, connected to said charging, for stopping operation thereof when said recess reaches a position to oppose said charging means.

10. An image forming apparatus comprising:

a rotatable photosensitive body including an outer circumferential surface having a recess for holding a lubricant therein at a part thereof;

driving means for rotating said photosensitive body;

a cleaning blade which is capable of being in contact with said outer circumferential surface of said photosensitive body and which removes a residual developer on said outer circumferential surface upon contact therewith;

feeding means comprising a rotatable brush roller, which is, upon rotation of said photosensitive body, brought into contact with any lubricant held in the recess to feed lubricant to said part of the outer circumferential surface of said photosensitive body which is brought into contact with said cleaning blade to form a thin film of lubricant;

charging means, arranged around said outer circumferential surface of said photosensitive body, for charging said outer circumferential surface; and controlling means, connected to said charging means, for stopping operation thereof when said recess reaches a position to oppose said charging means.

11. The apparatus according to claim 10, which further comprises:

transferring means, arranged around said outer circumferential surface of said photosensitive body, for transferring a toner image formed on said outer circumferential surface onto a copying paper; and wherein said controlling means is connected to said transferring means, for stopping operation thereof when said recess reaches a position to oppose said transferring means.

12. An image forming apparatus comprising:

a rotatable photosensitive body including an outer circumferential surface having a recess for holding a lubricant therein at a part thereof;

driving means for rotating said photosensitive body;

a cleaning blade which is capable of being in contact with said outer circumferential surface of said photosensitive body and which removes a residual developer on said outer circumferential surface upon contact therewith;

feeding means for feeding any lubricant held in the recess to part of the outer circumferential surface of said photosensitive body which is brought into contact with said cleaning blade to form a thin film of lubricant upon contacting with any lubricant held in said recess as said photosensitive body is rotated;

charging means, arranged around said outer circumferential surface of said photosensitive body, for charging said outer circumferential surface; and controlling means, connected to said charging means, for stopping operation thereof when said recess reaches a position to oppose said charging means.

13. The apparatus according to claim 12, which further comprises:

transferring means, arranged around said outer circumferential surface of said photosensitive body, for transferring a toner image formed on said outer circumferential surface onto a copying paper; and wherein said controlling means is connected to said transferring means, for stopping operation thereof when said recess reaches a position to oppose said transferring means.

* * * * *